(12) United States Patent  
Lieberman et al.

(10) Patent No.: US 7,781,722 B2
(45) Date of Patent: Aug. 24, 2010

(54) OPTICAL TOUCH SCREEN ASSEMBLY

(75) Inventors: Klony Lieberman, Jerusalem (IL); Yaniv Maor, Modiin (IL); Yossi Chay, Tel Aviv (IL); Yuval Sharon, Jerusalem (IL)

(73) Assignee: Lumio Inc, Woodland Hills, CA (US)

( * ) Notice: Subject to any disclaimer, the term of this patent is extended or adjusted under 35 U.S.C. 154(b) by 0 days.

(21) Appl. No.: 12/027,293

(22) Filed: Feb. 7, 2008

(65) Prior Publication Data

US 2009/0200453 A1    Aug. 13, 2009

(51) Int. Cl.
  *G06M 7/00* (2006.01)
  *G06F 3/041* (2006.01)
(52) U.S. Cl. ................................ 250/221; 345/173
(58) Field of Classification Search .......... 250/221, 250/549, 239, 227.14, 227.11; 345/173, 345/175, 176, 156–158
See application file for complete search history.

(56) References Cited

U.S. PATENT DOCUMENTS

| 5,257,340 | A |   | 10/1993 | Kaplan |
| 5,295,047 | A |   | 3/1994 | Windross |
| 5,905,583 | A | * | 5/1999 | Kawai et al. ............... 358/484 |
| 5,969,343 | A | * | 10/1999 | Nakamura et al. ..... 250/227.31 |
| 6,229,529 | B1 | * | 5/2001 | Yano et al. ................. 345/175 |
| 6,648,496 | B1 |   | 11/2003 | Elghoroury et al. |
| 6,783,269 | B2 |   | 8/2004 | Pashley et al. |
| 6,972,401 | B2 |   | 12/2005 | Akitt et al. |
| 7,021,809 | B2 |   | 4/2006 | Iwasa et al. |
| 7,042,444 | B2 | * | 5/2006 | Cok ............................ 345/173 |
| 7,099,553 | B1 |   | 8/2006 | Graham et al. |
| 7,163,326 | B2 |   | 1/2007 | Cassarly et al. |
| 2004/0149892 | A1 | * | 8/2004 | Akitt et al. .................. 250/221 |
| 2004/0179112 | A1 | * | 9/2004 | Chen ....................... 348/222.1 |
| 2005/0077452 | A1 | * | 4/2005 | Morrison et al. ............ 250/221 |
| 2005/0128190 | A1 |   | 6/2005 | Ryynanen |
| 2005/0248540 | A1 |   | 11/2005 | Newton |

FOREIGN PATENT DOCUMENTS

JP           2006011567      *  1/2006

* cited by examiner

*Primary Examiner*—Thanh X Luu
*Assistant Examiner*—Jennifer Bennett

(57) ABSTRACT

An optical touch panel including a support defining a detection region, an optical illumination assembly including at least two edge emitting optical light guides extending along adjacent portions of the detection region and having ends adjacent to one another and at least one mechanical coupling and optical coupling assembly, at least one sensor assembly, operative to detect changes in the light received from the optical illumination assembly produced by the presence of an object in the detection region and detection circuitry receiving at least one output from the at least one sensor assembly and providing an output indication of the two dimensional location of object impingement in the detection region.

15 Claims, 16 Drawing Sheets

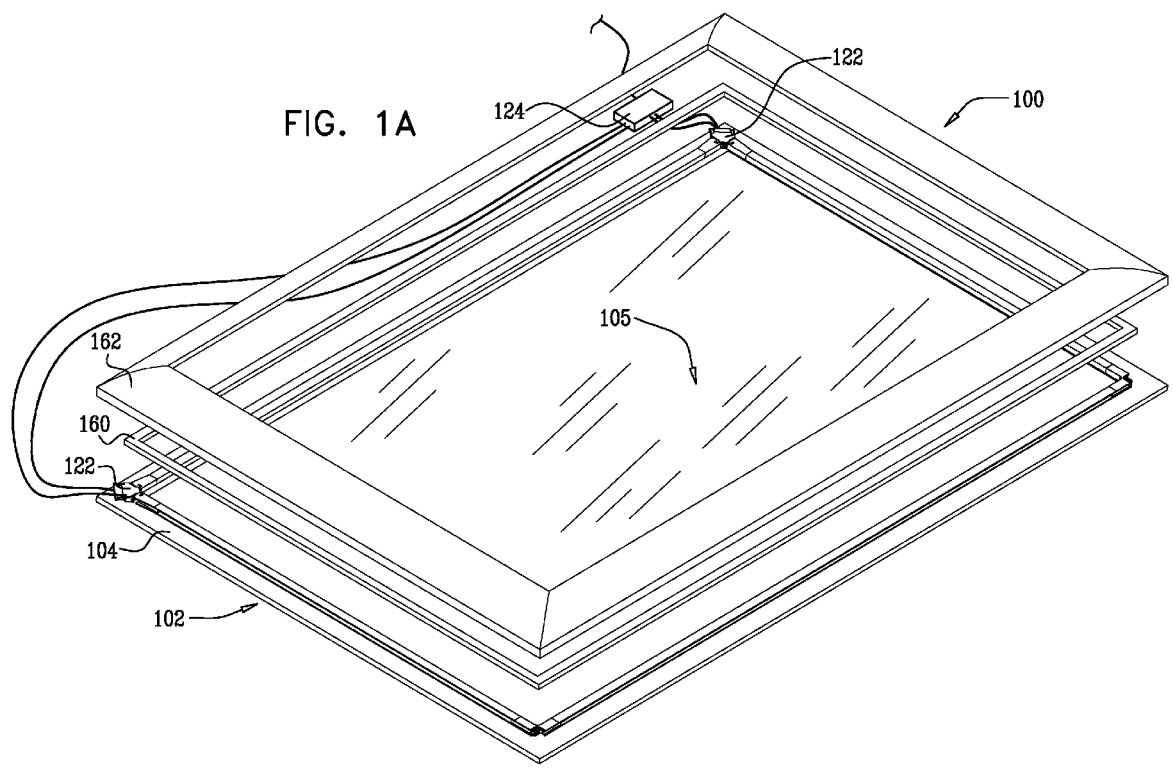

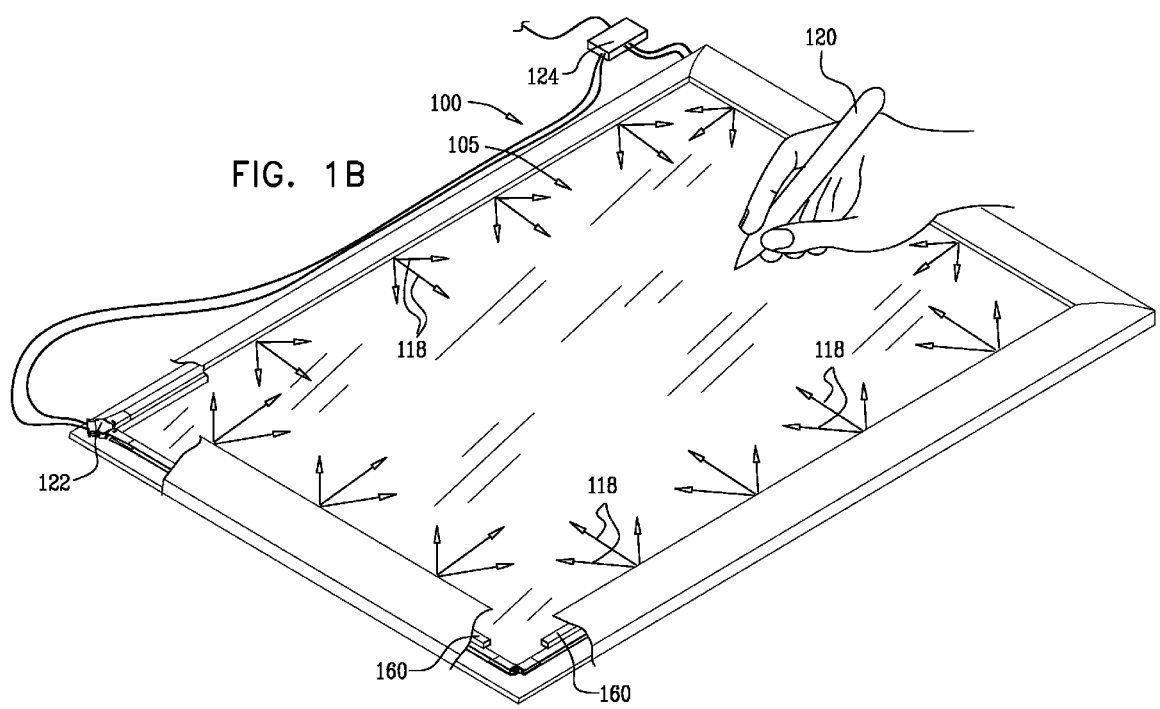

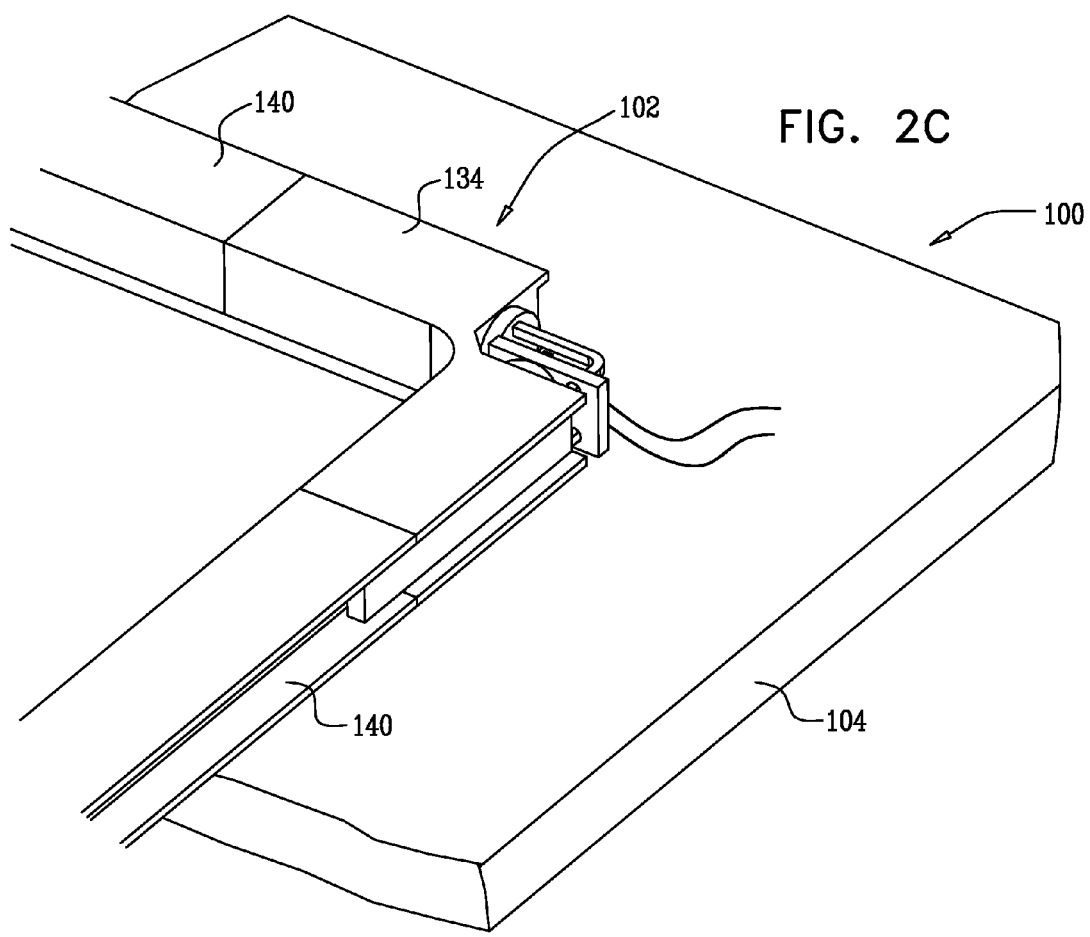

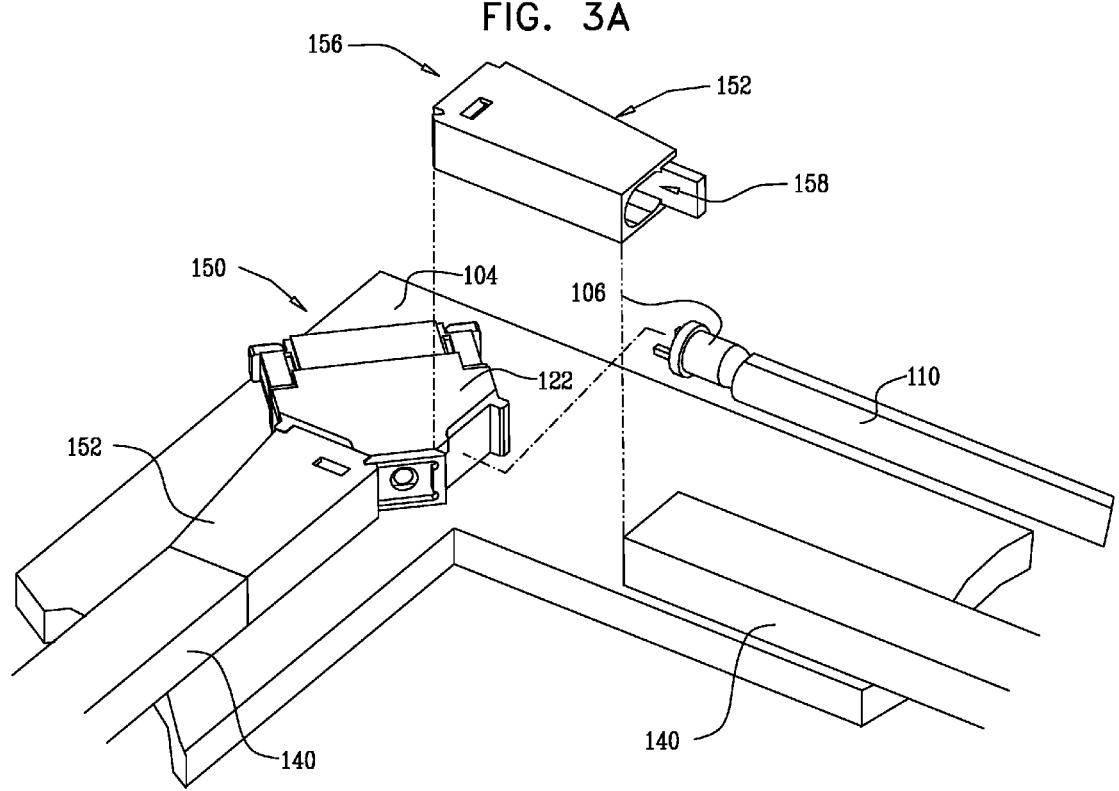

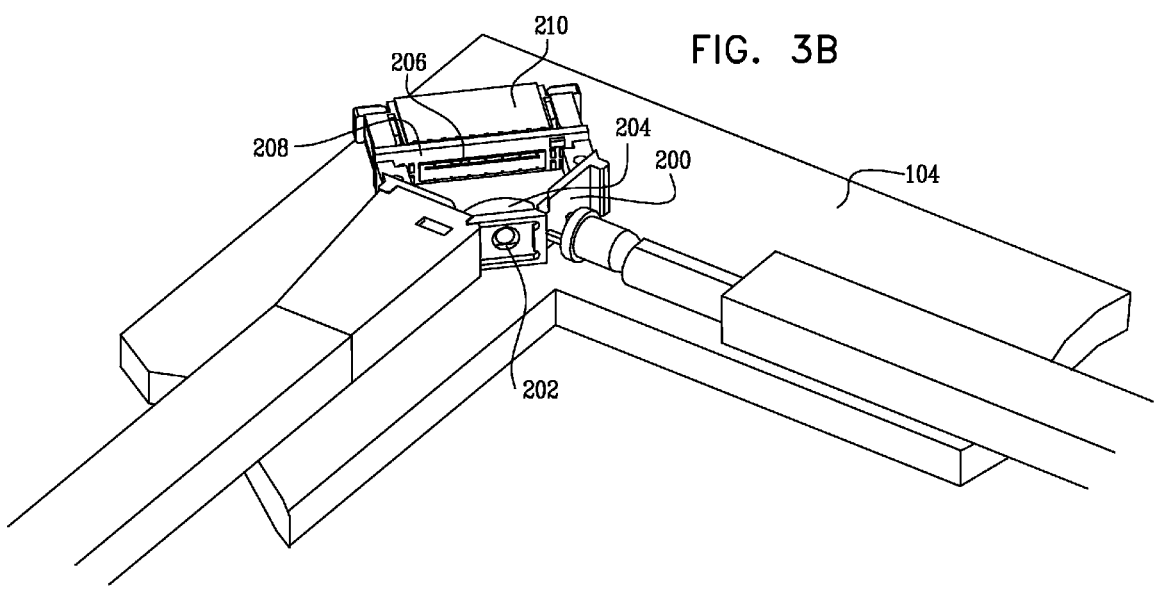

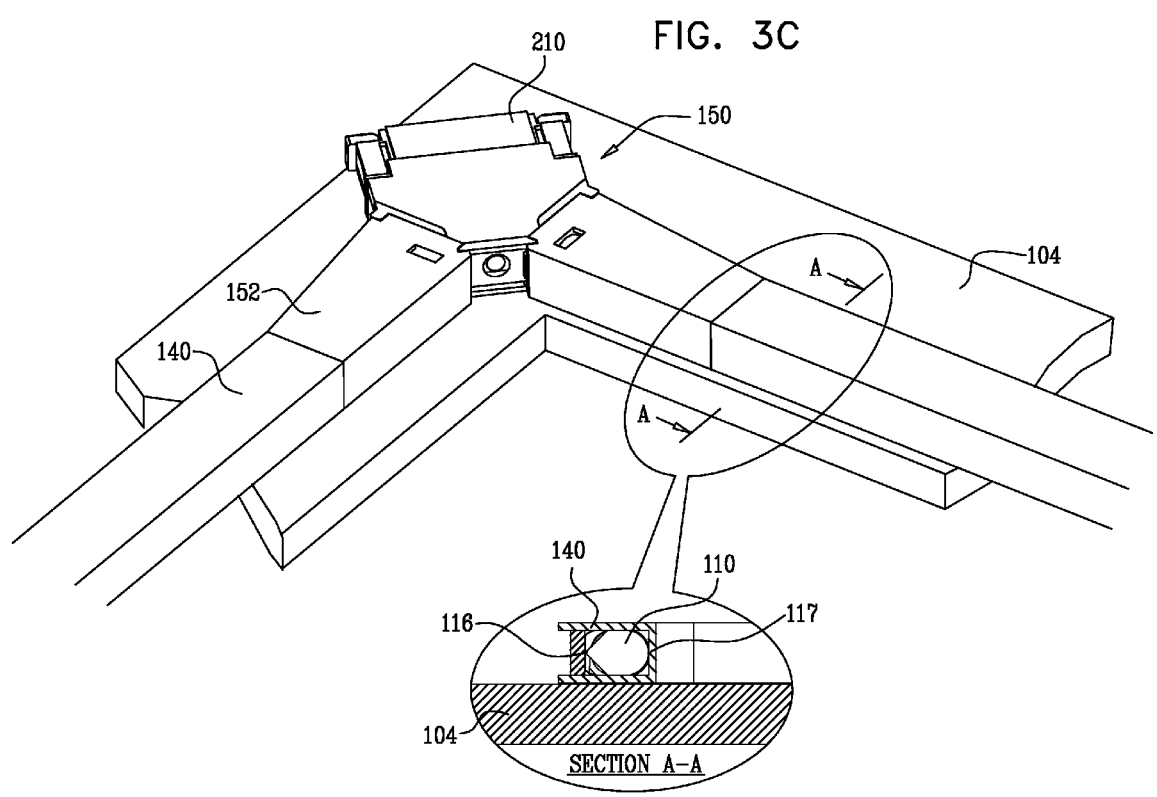

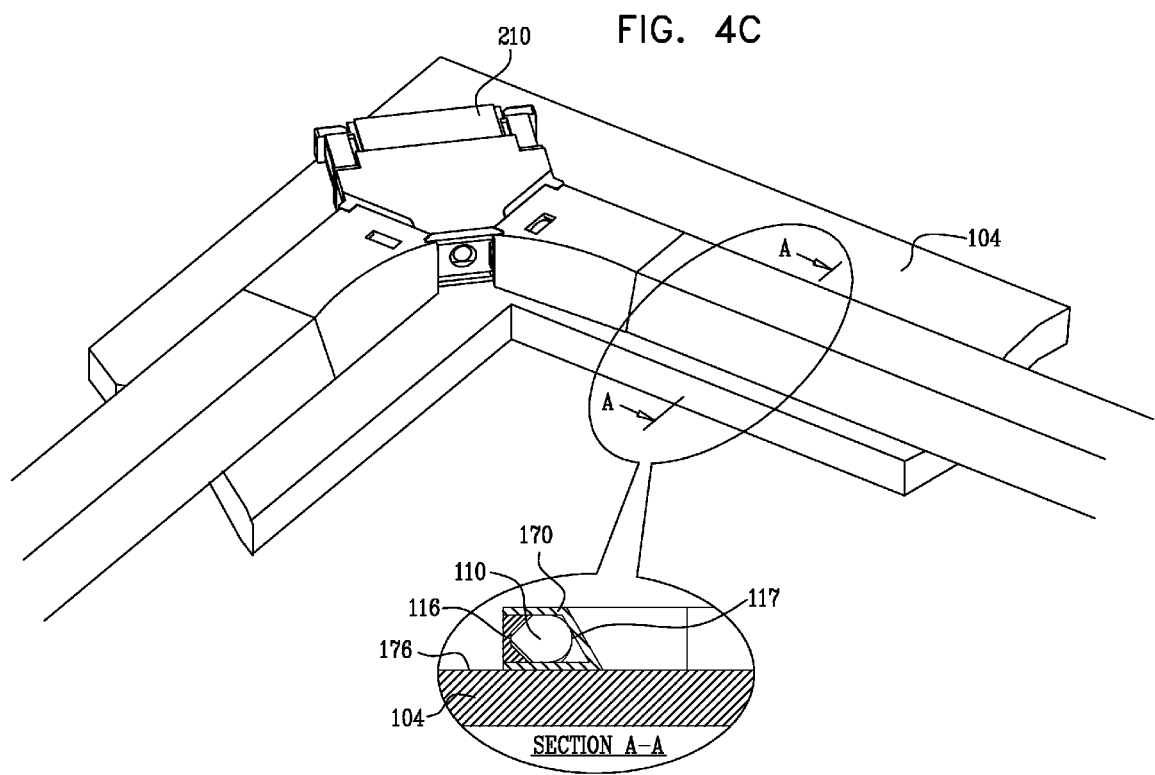

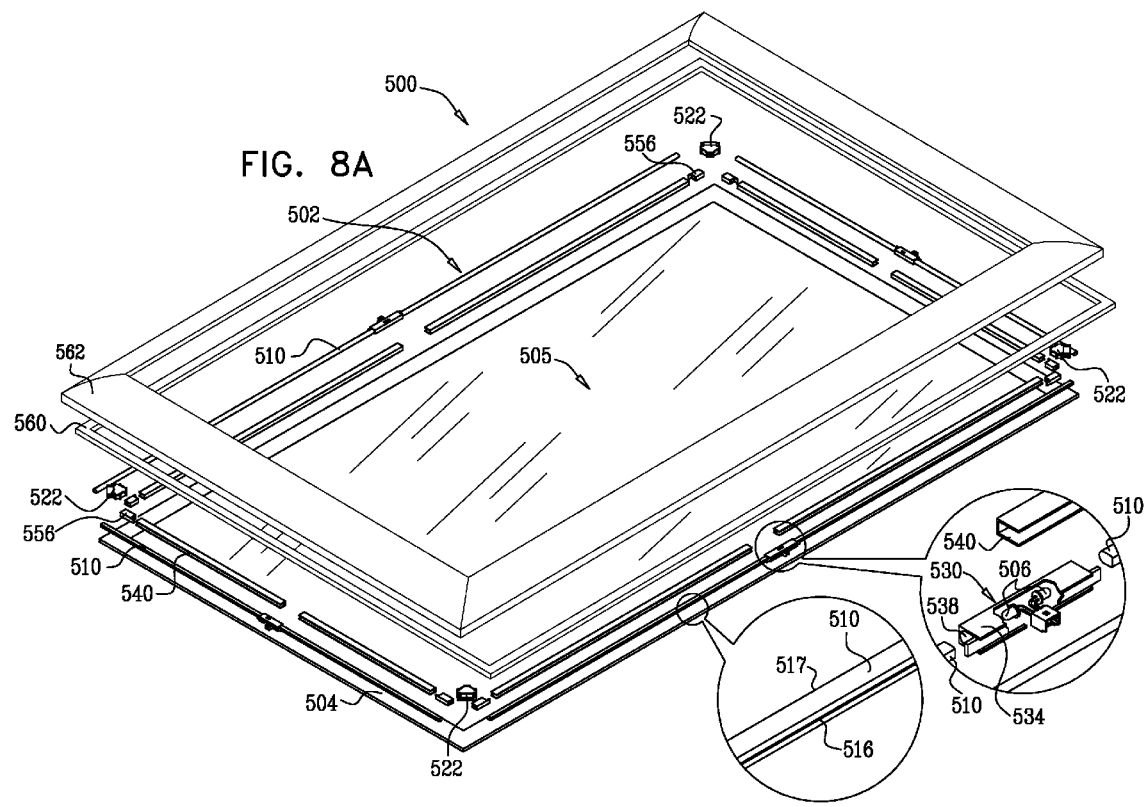

OPTICAL TOUCH SCREEN ASSEMBLY

FIELD OF THE INVENTION

The present invention relates to optical devices generally.

BACKGROUND OF THE INVENTION

The following U.S. Patent Publications are believed to represent the current state of the art:

U.S. Pat. Nos. 6,648,496; 7,021,809; 7,099,553; 6,972,401; 5,257,340; 6,783,269; 5,905,583; 5,295,047; 7,163,326; and U.S. Patent Applications 2005-0248540; and 2005-0128190

SUMMARY OF THE INVENTION

The present invention seeks to provide optical illumination and coupling assemblies for use with optical touch panels and optical touch panels utilizing these assemblies.

There is thus provided in accordance with a preferred embodiment of the present invention an optical touch panel including a support defining a detection region, an optical illumination assembly including at least two edge emitting optical light guides extending along adjacent portions of the detection region and having ends adjacent to one another and at least one mechanical coupling and optical coupling assembly including first and second mechanical coupling portions mechanically coupled to the ends of the optical light guides for mechanically retaining the ends, at least one illumination source and first and second optical coupling portions optically coupled to the ends of the optical light guides for optically coupling the ends to the at least one illumination source, at least one sensor assembly, operative to detect changes in the light received from the optical illumination assembly produced by the presence of an object in the detection region and detection circuitry receiving at least one output from the at least one sensor assembly and providing an output indication of the two dimensional location of object impingement in the detection region.

Preferably, the optical illumination assembly is arranged along and above at least a part of the periphery of the support. Additionally or alternatively, the optical illumination assembly is arranged along and above all of the periphery of the support.

Preferably, the support includes a generally rectangular support.

Preferably, each of the optical light guides includes at least one light scatterer at at least one location therealong. Additionally, the at least one light scatterer is located opposite at least one light transmissive region of the light guide.

Preferably, the at least one light guide has optical power at the at least one light transmissive region. Additionally, the optical power collimates and directs scattered light in a direction generally away from the at least one light scatterer. Alternatively or additionally, the light guide has a focus located in proximity to the light scatterer at the transmissive region.

Preferably, the light guide includes a plastic rod. Additionally, the at least one light scatterer is defined by a strip of white paint extending along the plastic rod.

Preferably, the light guide and the at least one light scatterer are integrally formed.

Preferably, the light guide extends generally continuously along a periphery of a light curtain area defined by the detection region and the at least one light scatterer extends generally continuously along the periphery, directing light generally in a plane, filling the interior of the periphery and defining a light curtain therewithin.

Preferably, the at least one sensor assembly includes at least two sensor assemblies.

Preferably, the optical touch panel also includes at least one sensor, illumination, mechanical coupling and optical coupling assembly including a sensor assembly and a pair of mechanical and optical coupling elements connected to the sensor assembly. Additionally, the sensor, illumination, mechanical coupling and optical coupling assembly also includes a socket for receiving and retaining the light source and a socket for receiving and retaining an end of a light guide.

Preferably, the sensor assembly includes a support plate defining a reference surface, a lens assembly fixed to the reference surface and a chip scale packaged solid state detector fixed to the reference surface and disposed in predetermined alignment with the lens assembly. Additionally, the optical touch panel also includes an edge connection printed circuit board connected to the chip scale packaged solid state detector.

There is also provided in accordance with another preferred embodiment of the present invention illumination, mechanical coupling and optical coupling apparatus for use with an optical touch panel, the touch panel including a support defining a detection region, the apparatus including at least two edge emitting optical light guides extending along adjacent portions of the detection region and having ends adjacent to one another and at least one mechanical coupling and optical coupling assembly including first and second mechanical coupling portions mechanically coupled to the ends of the optical light guides for mechanically retaining the ends, at least one illumination source and first and second optical coupling portions optically coupled to the ends of the optical light guides for optically coupling the ends to the at least one illumination source.

There is further provided in accordance with yet another preferred embodiment of the present invention an optical touch panel including a support defining a detection plane and at least one sensor assembly including a housing defining a lens mount window in which is fixed a lens and a solid state detector disposed in predetermined alignment with the lens for viewing the detection plane.

Preferably, the solid state detector is enclosed in a chip-scale package, which is, in turn, mounted in the housing.

There is yet further provided in accordance with still another preferred embodiment of the present invention an optical touch panel including a support defining a detection plane and at least one sensor assembly including a support plate defining a reference surface, a lens assembly fixed to the reference surface and a chip scale packaged solid state detector fixed to the reference surface and disposed in predetermined alignment with the lens assembly.

Preferably, the optical touch panel also includes an edge connection printed circuit board connected to the chip scale packaged solid state detector.

There is even further provided in accordance with another preferred embodiment of the present invention an optical touch panel including a support defining a detection region, an optical illumination assembly operative to illuminate the detection region, at least one sensor, illumination, mechanical coupling and optical coupling assembly including at least one sensor assembly, operative to detect changes in the light received from the optical illumination assembly produced by the presence of an object in the detection region and a pair of mechanical and optical coupling elements connected to the sensor assembly and detection circuitry receiving at least one output from the at least one sensor assembly and providing an output indication of the two dimensional location of object impingement in the detection region.

Preferably, the sensor, illumination, mechanical coupling and optical coupling assembly also includes a socket for receiving and retaining a light source and a socket for receiving and retaining an end of a light guide. Additionally or alternatively, the sensor assembly includes a support plate defining a reference surface, a lens assembly fixed to the reference surface and a chip scale packaged solid state detector fixed to the reference surface and disposed in predetermined alignment with the lens assembly. Additionally, the optical touch panel also includes an edge connection printed circuit board connected to the chip scale packaged solid state detector.

BRIEF DESCRIPTION OF THE DRAWINGS

The present invention will be understood and appreciated more fully from the following detailed description, taken in conjunction with the drawings in which:

FIG. 1A is a simplified exploded view illustration of a touch panel constructed and operative in accordance with a preferred embodiment of the present invention;

FIG. 1B is a simplified assembled view illustration of the touch panel of FIG. 1A;

FIGS. 2A, 2B and 2C are simplified respective exploded view, disassembled view and assembled view illustrations of illumination, mechanical coupling and optical coupling apparatus, useful in the touch panel of FIGS. 1A & 1B;

FIGS. 3A, 3B and 3C are simplified respective exploded view, disassembled view and assembled view illustrations of combined sensor, illumination, mechanical coupling and optical coupling apparatus, useful in the touch panel of FIGS. 1A & 1B constructed and operative in accordance with a first embodiment of the invention;

FIGS. 4A, 4B and 4C are simplified respective exploded view, disassembled view and assembled view illustrations of combined sensor, illumination, mechanical coupling and optical coupling apparatus, useful in the touch panel of FIGS. 1A & 1B constructed and operative in accordance with a second embodiment of the invention;

FIGS. 8A and 8B are simplified exploded and assembled view illustrations of a touch panel constructed and operative in accordance with another preferred embodiment of the present invention.

DETAILED DESCRIPTION OF PREFERRED EMBODIMENTS

Reference is now made to FIGS. 1A, 1B, 2A, 2B, 2C, 3A, 3B and 3C, which illustrate an optical touch panel 100 constructed and operative in accordance with a preferred embodiment of the present invention. As seen in FIGS. 1A and 1B, the touch panel 100 comprises an optical illumination assembly 102 which is preferably arranged along and above all or part of the periphery of a support 104, typically a glass plate as shown in FIGS. 1A and 1B. Alternatively, the glass plate may be obviated and the support 104 may be a frame, as shown in FIGS. 2A-4C. Preferably, the optical illumination assembly 102 extends along most of the periphery of support 104 and typically along three of four edges of a generally planar detection region 105.

Figure 2A:
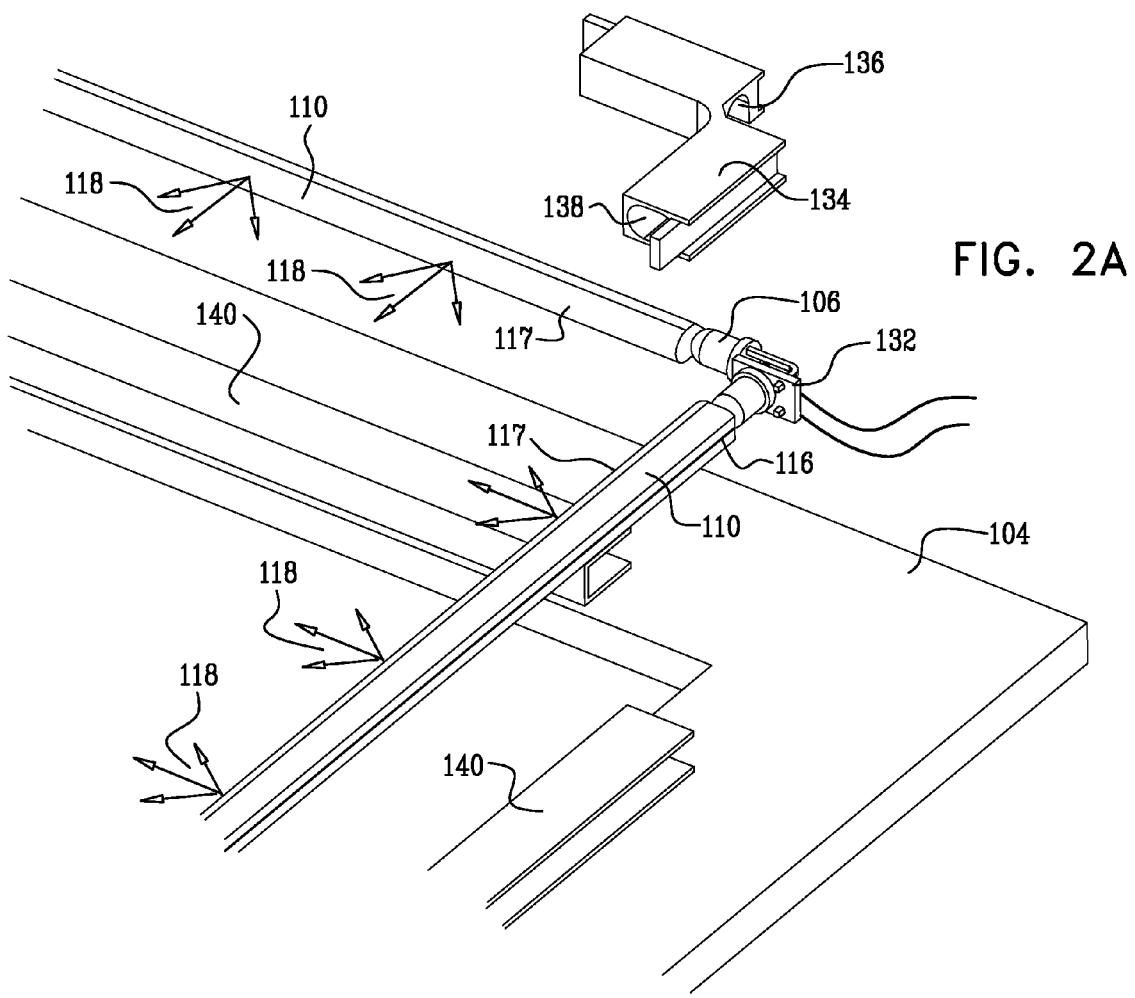
Figure 2B:
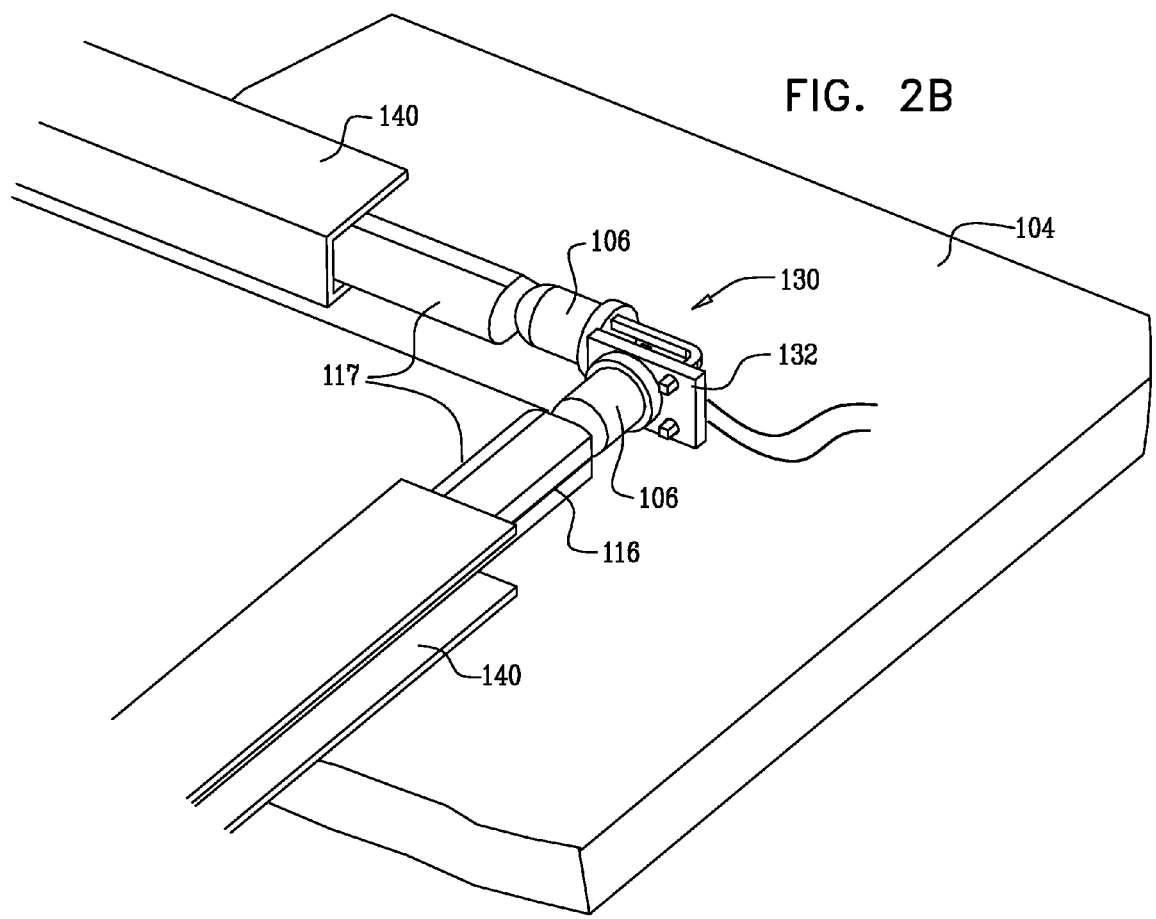

In accordance with a preferred embodiment of the present invention, the optical illumination assembly 102 receives illumination from light sources 106, such as an LED or a diode laser, preferably an infrared laser or infrared LED. As seen in FIGS. 2A and 2B, light sources 106 are preferably located at one or more corners of the periphery of the generally planar detection region 105.

In accordance with a preferred embodiment of the present invention, the optical illumination assembly 102 comprises at least one light guide 110, such as a plastic rod, which preferably has at least one light scatterer 116 at at least one location therealong, preferably opposite at least one light transmissive region 117 of the light guide 110, at which region 117 the light guide 110 has optical power. A surface of light guide 110 at transmissive region 117 preferably has a focus located in proximity to light scatterer 116.

In the illustrated embodiment, light scatterer 116 is preferably defined by a narrow strip of white paint extending along the plastic rod along at least a substantial portion of the entire length of the optical illumination assembly 102. In an alternative preferred embodiment, not shown, light guide 110 and light scatterer 116 are integrally formed as a single element, for example by co-extruding a transparent plastic material along with a pigment embedded plastic material to form a thin light scattering region 116 at an appropriate location along light guide 110.

In accordance with a preferred embodiment of the present invention, the at least one light scatterer 116 is operative to scatter light which is received from the light source 106 and passes along the at least one light guide 110. The optical power of the light guide 110 at the at least one light transmissive region 117 collimates and directs the scattered light in a direction generally away from the scatterer 116, as indicated generally by reference numeral 118. It is appreciated that generally every location in generally planar detection region 105 receives light generally from every location along the at least one light transmissive region 117.

In accordance with a preferred embodiment of the present invention, the at least one light guide 110 extends generally continuously along a periphery of a light curtain area defined by the detection region 105 and the at least one light scatterer 116 extends generally continuously along the periphery, directing light generally in a plane, filling the interior of the periphery and thereby defining a light curtain therewithin.

In an alternative embodiment, the at least one light guide 110 extends along a periphery of a light curtain area defined by the detection region 105 and the at least one light scatterer 116 includes a plurality of separate light scatterers distributed along the periphery, whereby the plurality of light scatterers direct light generally in a plane, filling the interior of the periphery and thereby together defining a light curtain therewithin.

Impingement of an object, such as a finger or stylus 120, upon support 104 preferably is sensed by one or more light sensor assemblies 122, preferably disposed at corners of detection region 105. The sensor assemblies 122 detect changes in the light received from the optical illumination assembly 102 produced by the presence of stylus 120 in the detection region 105. Preferably, sensor assemblies 122 are located in the same plane as the optical illumination assembly 102. Preferably, two sensor assemblies 122 are sufficient to detect stylus 120 anywhere in the detection region 105, each sensor assembly 122 being located at an adjacent corner of the detection region 105 and having at least 90 degree coverage.

Preferably, sensor assemblies 122 each employ linear CMOS sensors, such as an ELIS-1024 linear image sensor commercially available from Panavision SVI, LLC of One Technology Place, Homer, N.Y., which are suitable for use in triangulation. The outputs of sensor assemblies 122 are supplied to detection circuitry 124, such as that described in assignee's U.S. Published Patent Application 2006/0187198 and U.S. Provisional Applications 60/819,891; 60/832,508 and 60/889,746, the disclosures of which are hereby incorporated by reference, which provides an output indication of the two dimensional location of the stylus 120 impingement in the detection region 105.

In the illustrated embodiment, there are provided at least two mechanical coupling and optical coupling assemblies 130, each of which includes a pair of light sources 106, preferably mounted onto a PCB 132, and a corner element 134, which includes sockets 136, for receiving and retaining light sources 106, and sockets 138, for receiving and retaining ends of light guides 110. Corner elements 134 are preferably located at two adjacent corners of support 104 and are adhered thereto preferably by adhesive. Corner elements 134 are arranged to butt against a pair of mutually perpendicularly extending light guide covers 140.

There are also preferably provided at least two sensor, illumination, mechanical coupling and optical coupling assemblies 150, each of which includes a sensor assembly 122 and a pair of mechanical and optical coupling elements 152 which are connected to sensor assembly 122. Each of mechanical and optical coupling elements 152 preferably includes a socket 156, for receiving and retaining light sources 106, and a socket 158, for receiving and retaining an end of a light guide 110. Each of mechanical and optical coupling elements 152 is arranged to butt against light guide cover 140. Alternatively, one or both light sources 106 may be obviated in assemblies 150.

Preferably there is provided a water-proof and dust proof seal between support 104, light guide covers 140 and assemblies 130 and 150, thereby to protect the touch panel assembly. The interiors of light guide covers 140 and assemblies 130 and 150 are preferably sealed from the outside. Preferably a circumferential gasket 160 is employed to sealingly surround these elements at the periphery of support 104 and to seal them to a circumferential cover element 162.

Figure 4A:
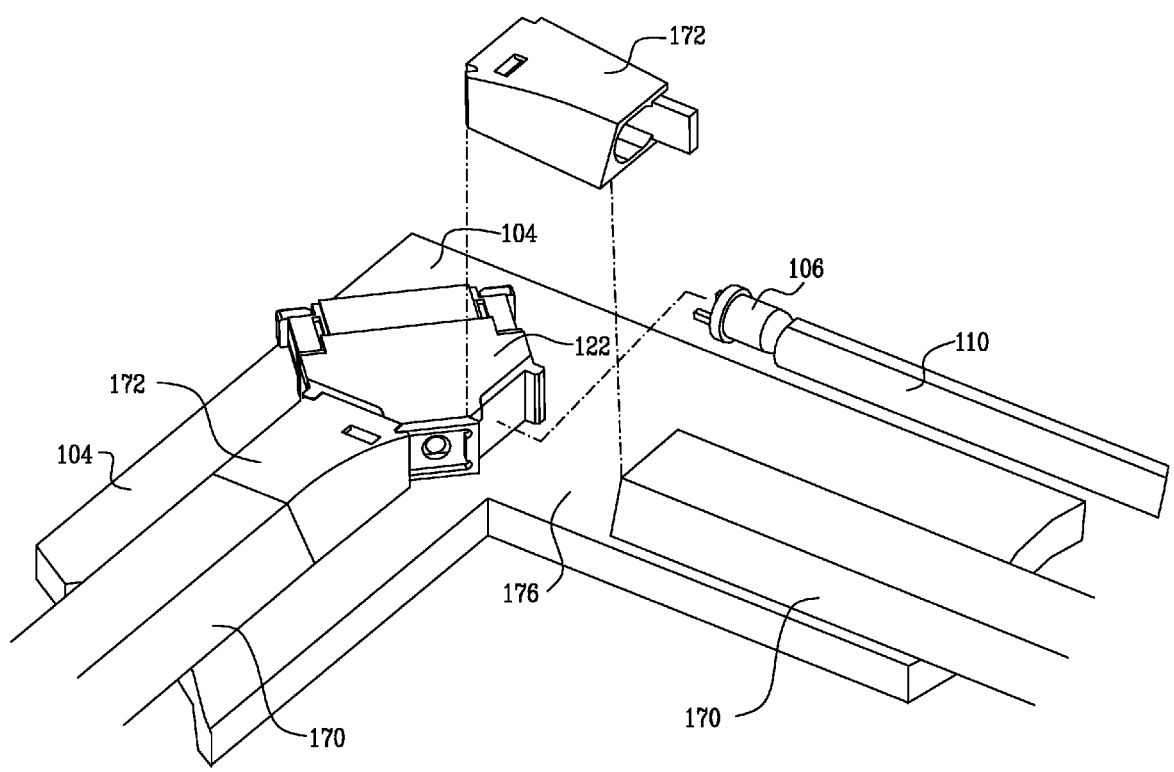
Figure 4B:
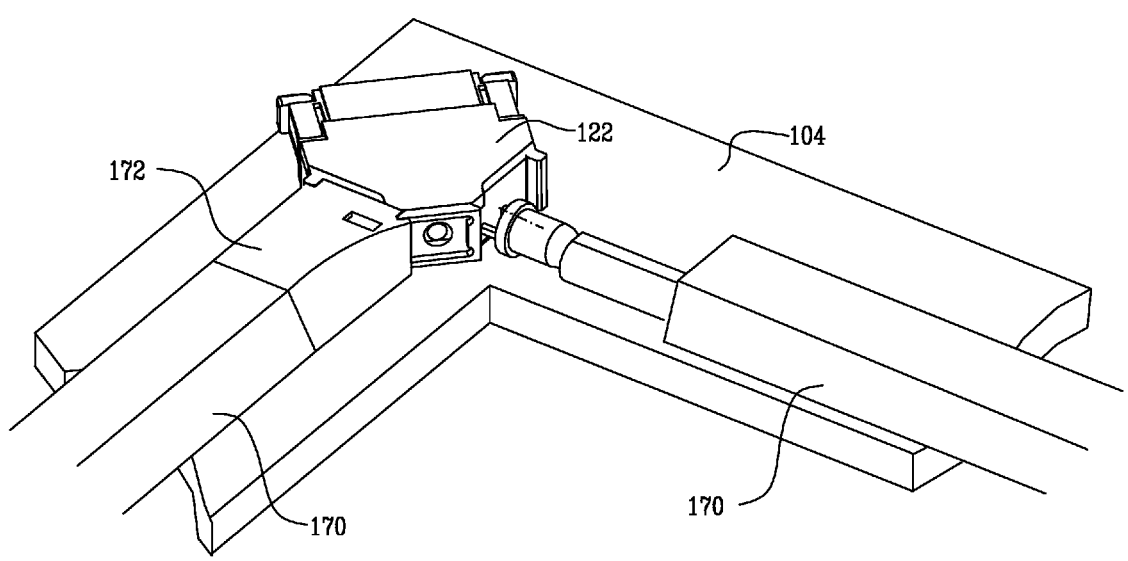

In the embodiment of FIGS. 3A-3C, the light guide covers 140 preferably have a generally rectangular cross section. FIGS. 4A-4C show a structure similar to that of FIGS. 3A-3C wherein light guide covers 170 and mechanical and optical coupling elements 172 have a non-rectangular cross section, which defines an obtuse angle with a top surface 176 of support 104. This arrangement tends to avoid collection of dust and dirt between surface 176 and light guide covers 170.

Figure 5A:
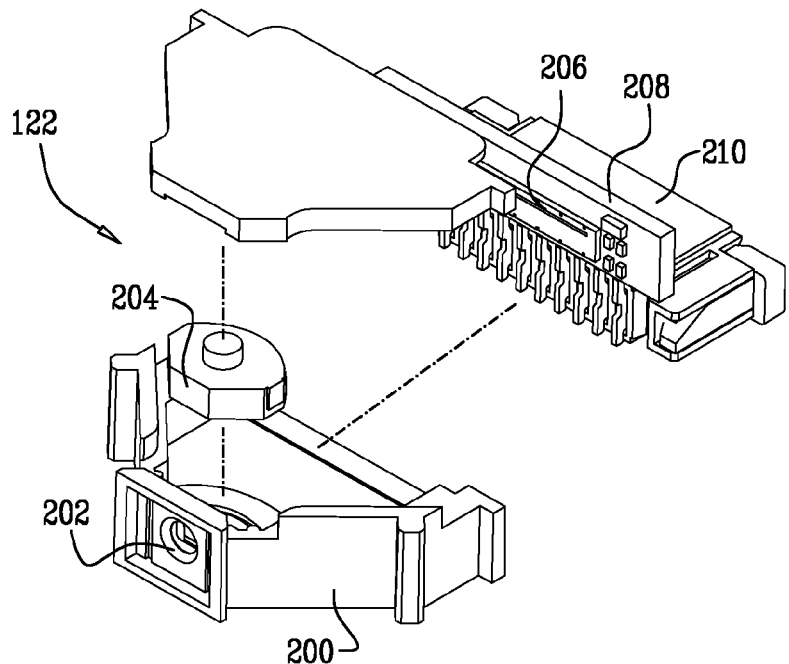
FIGS. 5A, 5B and 5C are simplified respective exploded view, disassembled view and assembled view illustrations of a sensor assembly forming part of the apparatus of FIGS. 3A-4C, constructed and operative in accordance with a first embodiment of the invention.
Figure 5B:
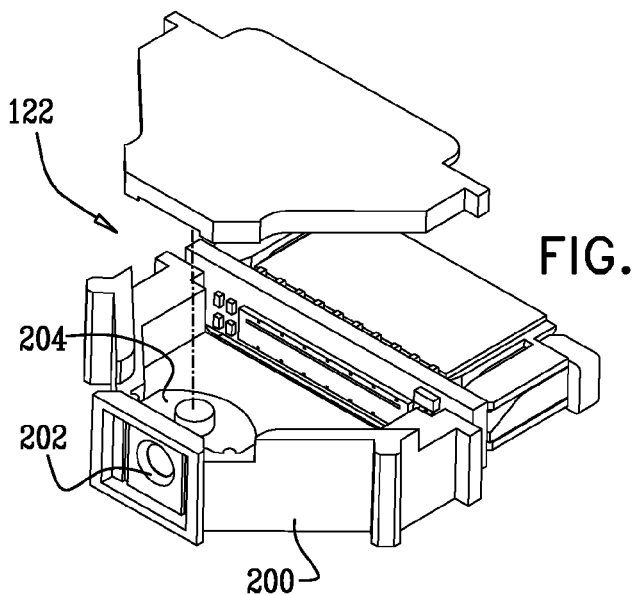
Figure 5C:
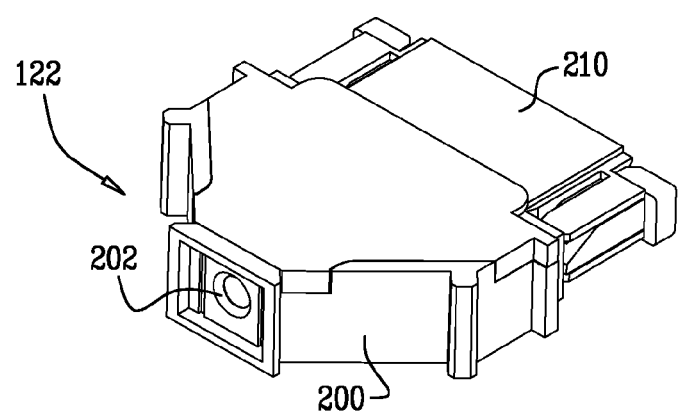

Reference is now made additionally to FIGS. 5A, 5B and 5C, which are simplified respective exploded view, disassembled view and assembled view illustrations of sensor assembly 122 forming part of the apparatus of FIGS. 3A-4C, constructed and operative in accordance with a first embodiment of the invention.

As seen in FIGS. 5A-5C, sensor assembly 122 comprises a housing 200, preferably injection molded of plastic and defining a lens mount window 202 in which is fixed a lens 204, which may be injection molded therewith. Disposed in predetermined alignment with lens 204 is a solid state detector 206, such as a linear CMOS sensor, preferably an ELIS-1024 linear image sensor commercially available from Panavision SVI, LLC of One Technology Place, Homer, N.Y., fixed onto a printed circuit board 208, which in turn is seated in housing 200. An electrical connector 210, also fixed in housing 200, provides electrical connections with detector 206.

Figure 6A:
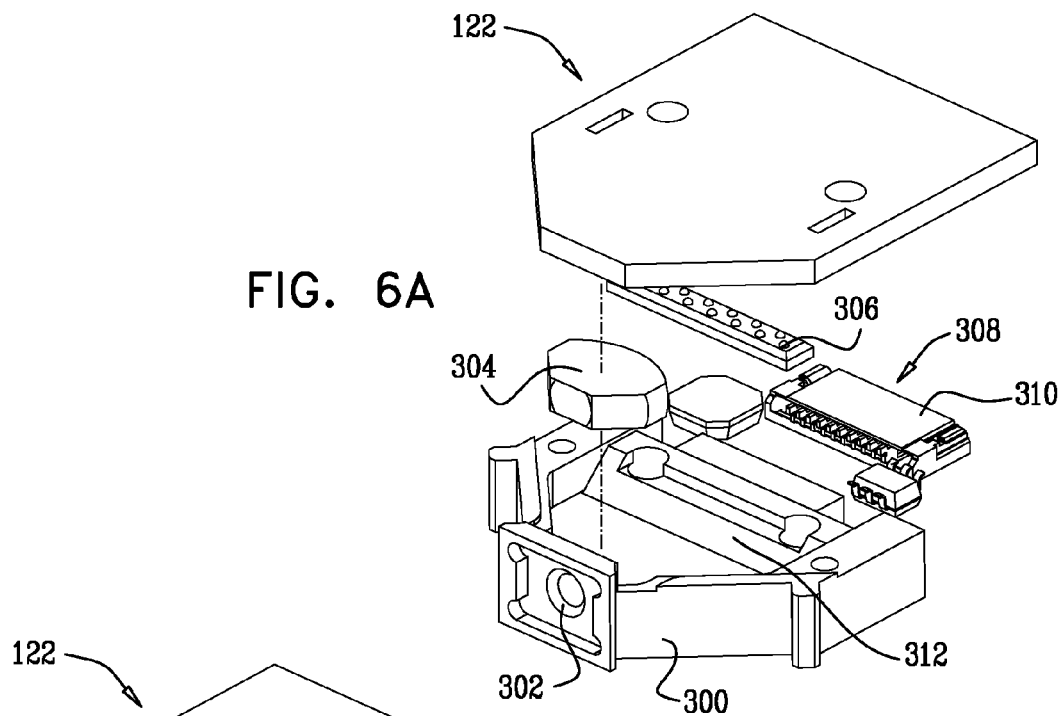
FIGS. 6A, 6B and 6C are simplified respective exploded view, disassembled view and assembled view illustrations of a sensor assembly forming part of the apparatus of FIGS. 3A-4C, constructed and operative in accordance with a second embodiment of the invention.
Figure 6B:
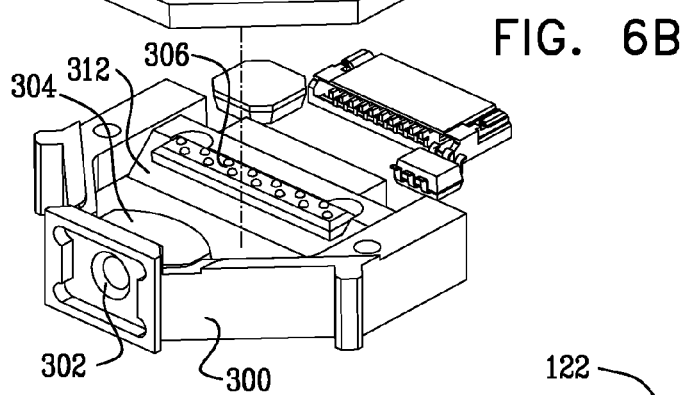
Figure 6C:
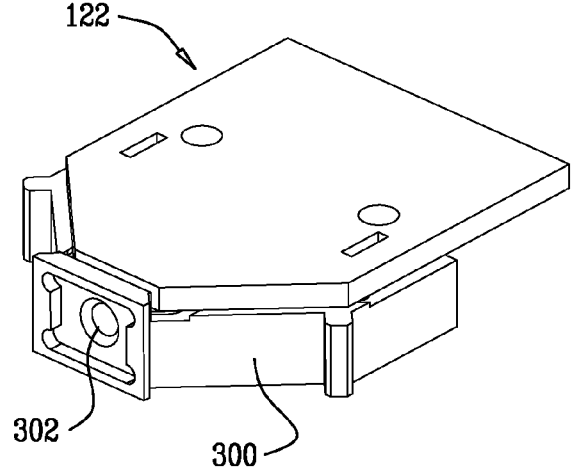

Reference is now made additionally to FIGS. 6A and 6B, which are simplified respective exploded view and assembled view illustrations of sensor assembly 122 forming part of the apparatus of FIGS. 3A-4C, constructed and operative in accordance with a second embodiment of the invention.

As seen in FIGS. 6A-6B, sensor assembly 122 comprises a housing 300, preferably injection molded of plastic and defining a lens mount window 302 in which is fixed a lens 304, which may be injection molded therewith. Disposed in predetermined alignment with lens 304 is a solid state detector 306, such as a linear CMOS sensor, preferably an ELIS-1024-CSP chip scale packaged linear image sensor commercially available from Panavision SVI, LLC of One Technology Place, Homer, N.Y., connected to a printed circuit board 308 having mounted thereon an electrical connector 310. Detector 306 views the detection plane via a mirror 312, fixed in housing 300. Detector 306 is fixed to mirror 312.

Figure 7A:
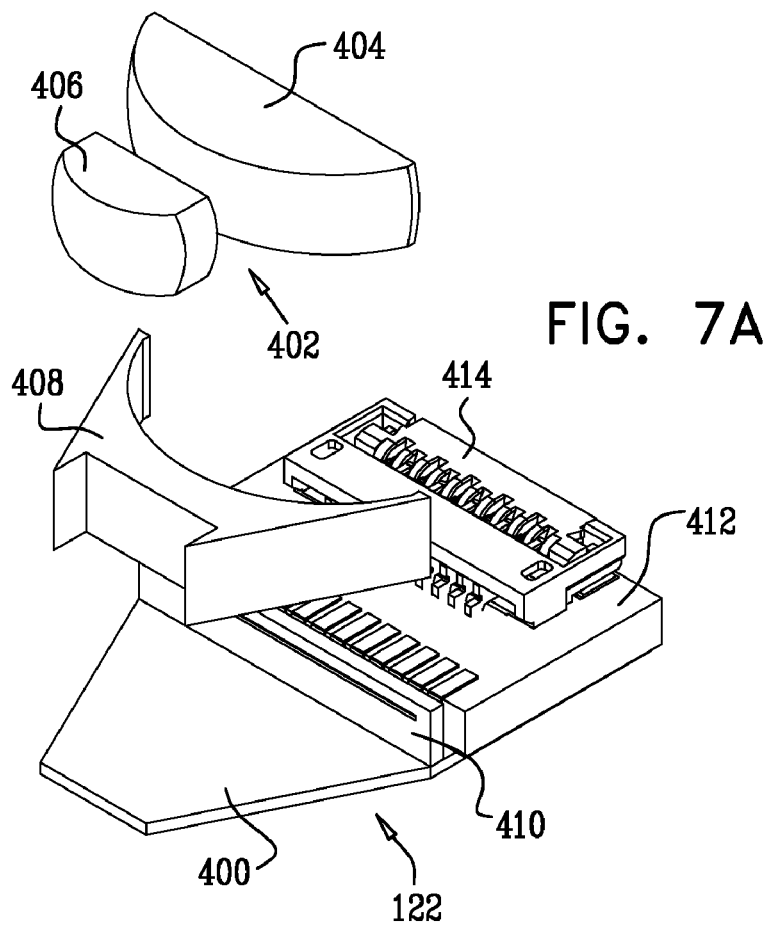
FIGS. 7A and 7B are simplified respective exploded view and assembled view illustrations of a sensor assembly forming part of the apparatus of FIGS. 3A-4C, constructed and operative in accordance with a third embodiment of the invention.
Figure 7B:
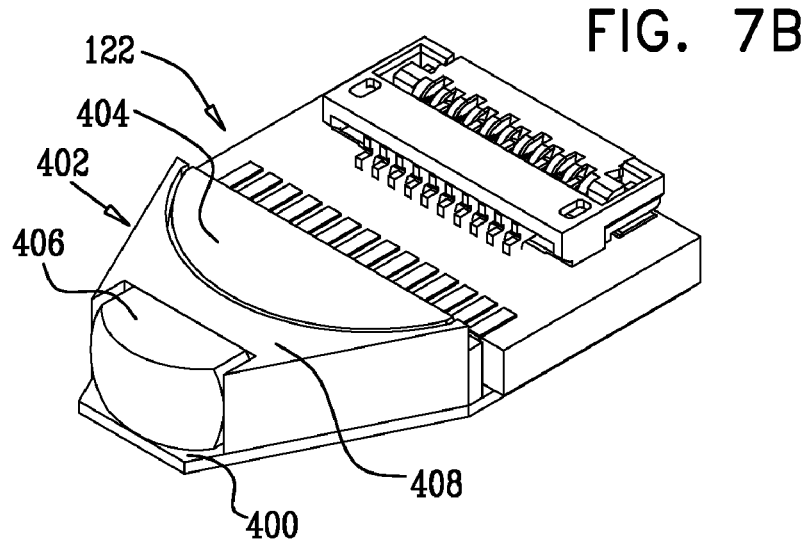

Reference is now made additionally to FIGS. 7A and 7B, which are simplified respective exploded view and assembled view illustrations of sensor assembly 122 forming part of the apparatus of FIGS. 3A-4C, constructed and operative in accordance with a third embodiment of the invention, characterized by small size.

As seen in FIGS. 7A-7B, sensor assembly 122 comprises a support plate 400, preferably formed of metal and defining a reference surface for a lens assembly 402, including first and second lenses 404 and 406 joined by a polymer mounting structure 408. Disposed in predetermined alignment with lens assembly 402 and fixed to support plate 400 is a solid state detector 410, such as a linear CMOS sensor, preferably an ELIS-1024-CSP chip scale packaged linear image sensor commercially available from Panavision SVI, LLC of One Technology Place, Homer, N.Y., having connected thereto an edge connection printed circuit board 412 having mounted thereon an electrical connector 414.

Figure 8B:
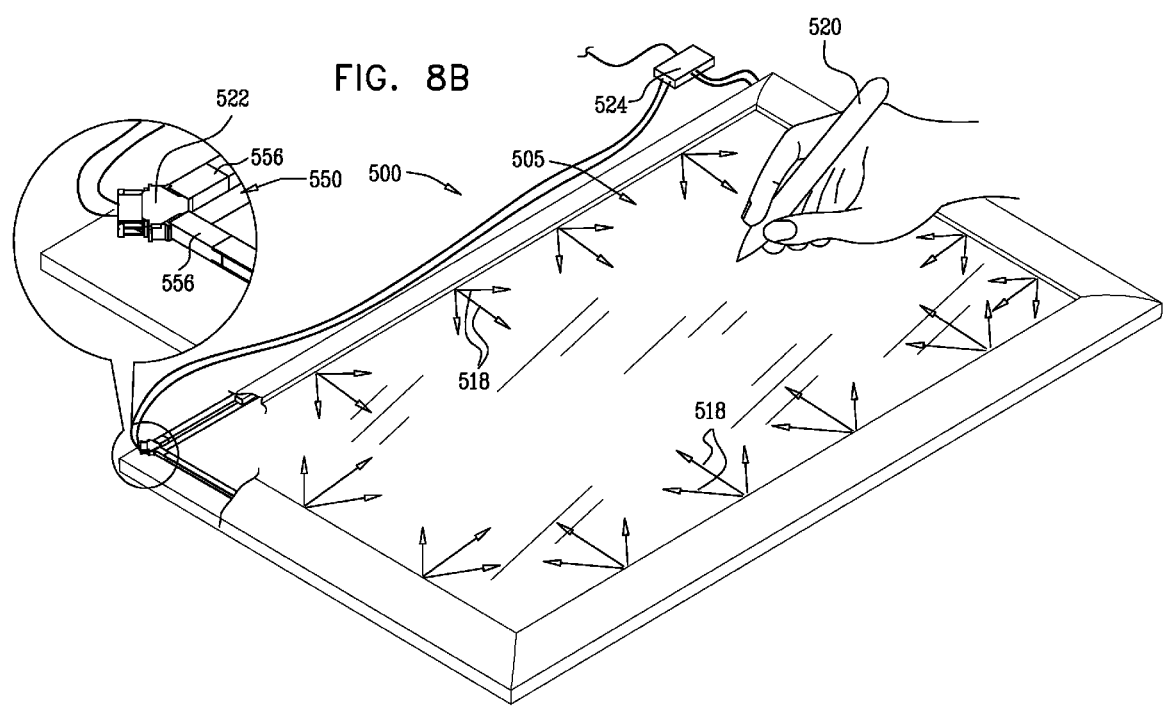

Reference is now made to FIGS. 8A and 8B, which illustrate an optical touch panel 500 constructed and operative in accordance with another preferred embodiment of the present invention. As seen in FIGS. 8A and 8B, touch panel 500 comprises an optical illumination assembly 502 which is preferably arranged along and above all or part of the periphery of a support 504, typically a glass plate as shown in FIGS. 8A and 8B. Alternatively, the glass plate may be obviated and the support 504 may be a frame, similar to that shown in FIGS. 2A-4C. Preferably, the optical illumination assembly 502 extends along most of the periphery of support 504 and typically along all four edges of a generally planar detection region 505.

In accordance with a preferred embodiment of the present invention, the optical illumination assembly 502 preferably receives illumination from one or more light sources 506, such as an LED or a diode laser, preferably an infrared laser or infrared LED. In the embodiment of FIGS. 8A and 8B, light sources 506 are preferably located in the center of a side of the periphery of the generally planar detection region 505.

In accordance with a preferred embodiment of the present invention, the optical illumination assembly 502 comprises at least one light guide 510, such as a plastic rod, which preferably has at least one light scatterer 516 at at least one location therealong, preferably opposite at least one light transmissive region 517 of the light guide 510, at which region 517 the light guide 510 has optical power. A surface of light guide 510 at transmissive region 517 preferably has a focus located in proximity to light scatterer 516.

In the illustrated embodiment, light scatterer 516 is preferably defined by a narrow strip of white paint extending along the plastic rod along at least a substantial portion of the entire length of the optical illumination assembly 502.

In accordance with a preferred embodiment of the present invention, the at least one light scatterer 516 is operative to scatter light which is received from the light source 506 and passes along the at least one light guide 510. The optical power of the light guide 510 at the at least one light transmissive region 517 collimates and directs the scattered light in a direction generally away from the scatterer 516, as indicated generally by reference numeral 518. It is appreciated that generally every location in generally planar detection region 505 receives light generally from every location along the at least one light transmissive region 517.

In accordance with a preferred embodiment of the present invention, the at least one light guide 510 extends generally continuously along a periphery of a light curtain area defined by the detection region 505 and the at least one light scatterer 516 extends generally continuously along the periphery, directing light generally in a plane, filling the interior of the periphery and thereby defining a light curtain therewithin.

In an alternative embodiment, the at least one light guide 510 extends along a periphery of a light curtain area defined by the detection region 505 and the at least one light scatterer 516 includes a plurality of separate light scatterers distributed along the periphery, whereby the plurality of light scatterers direct light generally in a plane, filling the interior of the periphery and thereby together defining a light curtain therewithin.

Impingement of an object, such as a finger or stylus 520, upon support 504 preferably is sensed by one or more light sensor assemblies 522, preferably disposed at corners of detection region 505. The sensor assemblies 522 detect changes in the light received from the optical illumination assembly 502 produced by the presence of stylus 520 in the detection region 505. Preferably, sensor assemblies 522 are located in the same plane as the optical illumination assembly 502. In the embodiment of FIGS. 8A and 8B, four sensor assemblies 522 are provided to detect stylus 520 anywhere in the detection region 505, each sensor assembly 522 being located at a corner of the detection region 505 and having at least 90 degree coverage.

Preferably, sensor assemblies 522 each employ linear CMOS sensors, such as sensors described hereinabove with reference to the embodiments of FIGS. 1A-1B and FIGS. 5A-7B. The outputs of sensor assemblies 522 are supplied to detection circuitry 524, such as that described hereinabove with reference to the embodiments of FIGS. 1A-1B, which provides an output indication of the two dimensional location of the stylus 520 impingement in the detection region 505.

In the illustrated embodiment, there is provided at least one mechanical coupling and optical coupling assembly 530, each of which preferably includes a pair of light sources 506, preferably mounted onto a PCB (not shown), and at least one coupling element 534, which includes sockets (not shown), for receiving and retaining light sources 506, and sockets 538, for receiving and retaining ends of light guides 510. Coupling elements 534 are preferably located between two adjacent corners of support 504 and are adhered thereto, preferably by adhesive. Coupling elements 534 are arranged to butt against a pair of coaxially extending light guide covers 540. Coupling assembly 530 is preferably made from a transparent or translucent material so that sufficient light from light sources 506 can scatter or diffuse through the coupling assembly 530 so that no gaps are formed in the illumination of detection region 505.

In the embodiment of FIGS. 8A and 8B, there are also provided four sensor and mechanical coupling assemblies 550, each of which includes a sensor assembly 522 and a pair of mechanical coupling elements 556 for receiving and retaining an end of a light guide 510. As seen in FIG. 8B, light guide cover 540 is preferably butted against coupling element 556.

In an alternative embodiment (not shown) sensor assemblies 550 can be comprised of illumination, mechanical coupling and optical coupling assemblies similar to sensor, illumination, mechanical coupling and optical coupling assembly 150 (FIG. 3A), each of which includes a sensor assembly 122 and a pair of mechanical and optical coupling elements 152 which are connected to sensor assembly 122. Each of mechanical and optical coupling elements 152 preferably includes a socket 156, for receiving and retaining light sources 106, and a socket 158, for receiving and retaining an end of a light guide 110. Each of mechanical and optical coupling elements 152 is arranged to butt against light guide cover 140. Alternatively, one or both light sources 106 may be obviated in assemblies 150.

Preferably, there is provided a water-proof and dust proof seal between support 504, light guide covers 540 and assemblies 530 and 550, thereby to protect the touch panel assembly. The interiors of light guide covers 540 and assemblies 530 and 550 are preferably sealed from the outside. Preferably a circumferential gasket 560 is employed to sealingly surround these elements at the periphery of support 504 and to seal them to a circumferential cover element 562.

It is appreciated that the use of three or four sensor modules enables unambiguous detection of two or three simultaneous events, respectively.

It is appreciated that, although in the illustrated embodiments of FIGS. 1A-B and 8A-8B the optical touch panel is shown as a generally rectangular touch panel, the touch panel of the present invention may be of any suitable shape.

It will be appreciated by persons skilled in the art that the present invention is not limited by what has been particularly claimed hereinbelow. Rather the scope of the present invention includes various combinations and subcombinations of the features described hereinabove as well as modifications and variations thereof as would occur to persons skilled in the art upon reading the foregoing description with reference to the drawings and which are not in the prior art.

The invention claimed is:

1. An optical touch panel comprising:
   a support defining a detection region;
   an optical illumination assembly including:
      at least two edge emitting optical light guides extending along adjacent portions of said detection region and having ends adjacent to one another; and
      at least one mechanical coupling and optical coupling assembly comprising:
         first and second mechanical coupling portions mechanically coupled to said ends of said optical light guides for mechanically retaining said ends;
         at least one illumination source; and
         first and second optical coupling portions optically coupled to said ends of said optical light guides for optically coupling said ends to said at least one illumination source;

at least one sensor, illumination, mechanical coupling and optical coupling assembly comprising:
- at least one sensor assembly, operative to detect changes in the light received from said optical illumination assembly produced by the presence of an object in said detection region, said at least one sensor assembly comprising:
  - a support plate defining a reference surface;
  - a lens assembly fixed to said reference surface; and
  - a chip scale packaged solid state detector fixed to said reference surface and disposed in predetermined alignment with said lens assembly; and
- a pair of mechanical and optical coupling elements connected to said at least one sensor assembly;
- an edge connection printed circuit board connected to said chip scale packaged solid state detector; and
- detection circuitry receiving at least one output from said at least one sensor assembly and providing an output indication of the two dimensional location of object impingement in said detection region.

2. An optical touch panel according to claim 1 and wherein said optical illumination assembly is arranged along and above at least a part of the periphery of said support.

3. An optical touch panel according to claim 1 and wherein said optical illumination assembly is arranged along and above all of the periphery of said support.

4. An optical touch panel according to claim 1 and wherein said support comprises a generally rectangular support.

5. An optical touch panel according to claim 1 and wherein each of said optical light guides includes at least one light scatterer at least one location therealong.

6. An optical touch panel according to claim 5 and wherein said at least one light scatterer is located opposite at least one light transmissive region of said light guide.

7. An optical touch panel according to claim 6 and wherein said at least one light guide has optical power at said at least one light transmissive region.

8. An optical touch panel according to claim 7 and wherein said optical power collimates and directs scattered light in a direction generally away from said at least one light scatterer.

9. An optical touch panel according to claim 6 and wherein said light guide has a focus located in proximity to said light scatterer at said transmissive region.

10. An optical touch panel according to claim 5 and wherein said light guide comprises a plastic rod.

11. An optical touch panel according to claim 10 and wherein said at least one light scatterer is defined by a strip of white paint extending along said plastic rod.

12. An optical touch panel according to claim 5 and wherein said light guide and said at least one light scatterer are integrally formed.

13. An optical touch panel according to claim 5 and wherein said light guide extends generally continuously along a periphery of a light curtain area defined by said detection region and said at least one light scatterer extends generally continuously along said periphery, directing light generally in a plane, filling the interior of said periphery and defining a light curtain therewithin.

14. An optical touch panel according to claim 1 and wherein said at least one sensor assembly comprises at least two sensor assemblies.

15. An optical touch panel according to claim 1 and wherein said sensor, illumination, mechanical coupling and optical coupling assembly also comprises:
- a socket for receiving and retaining said light source; and
- a socket for receiving and retaining an end of a light guide.

* * * * *